July 13, 1937.  T. M. SHRADER  2,086,966
HEAT REGULATOR
Filed Nov. 21, 1935

INVENTOR
TERRY M. SHRADER

BY Charles McClain
ATTORNEY

Patented July 13, 1937

2,086,966

UNITED STATES PATENT OFFICE 2,086,966

HEAT REGULATOR

Terry M. Shrader, West Summit, N. J., assignor, by mesne assignments, to Radio Corporation of America, New York, N. Y., a corporation of Delaware Application November 21, 1935, Serial No. 50,831

4 Claims. (Cl. 219—20)

This invention relates to heat regulators and particularly to electrical controlling means for current operated heating means.

In electric furnaces and current operated heating devices it has been proposed to control the amount of current flowing to the heating elements by manual means or by thermostatic controlling means embodying mechanical movable parts of resistors or impedances or off-and-on switching means. Such heat regulators lack the required smoothness of operation for certain types of work, are costly in construction and are physically bulky.

An object of my invention is to devise an alternating current energized heat regulator for current operated heating means which is smooth in operation and which may continuously regulate the temperature of the heating means and within narrow limits.

It is a further object of my invention to devise electrical controlling means for current operated heating means that is stable in operation, inexpensive in construction, and light in weight.

A heating regulator constructed in accordance with my invention and exemplified in two embodiments in the following specification and drawing comprises a source of current for the heating element and a current regulating means for exerting a continuous current regulating action upon said current source.

A temperature responsive resistor, the resistance of which changes with temperature, is placed in the field of the heating element and is connected in one branch of a balanced bridge one pair of diagonal points of which is connected to a source of alternating current. The other pair of diagonal points of the bridge is coupled to an alternating current operated push-pull rectifier which delivers a voltage of varying amplitude and changing polarity to said current regulating means. The current regulating means responds to the voltage and polarity of the output of the rectifier so that the controlling action of the current regulating means is related to the resistance and hence the temperature of said temperature responsive resistor.

Figure 1:
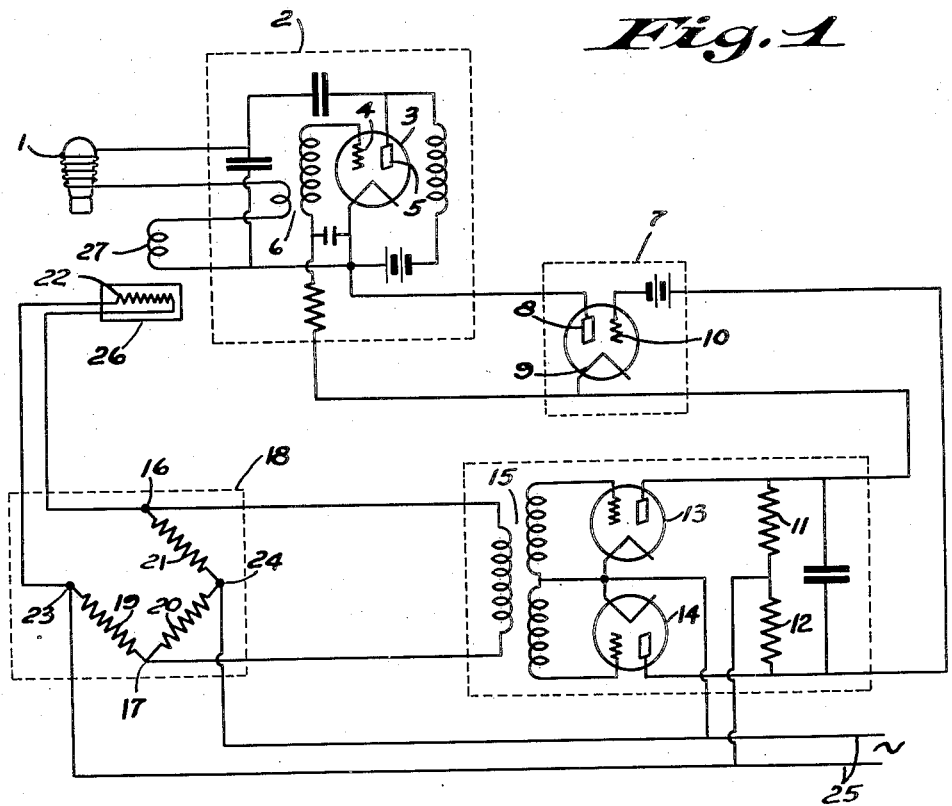
Figure 2:
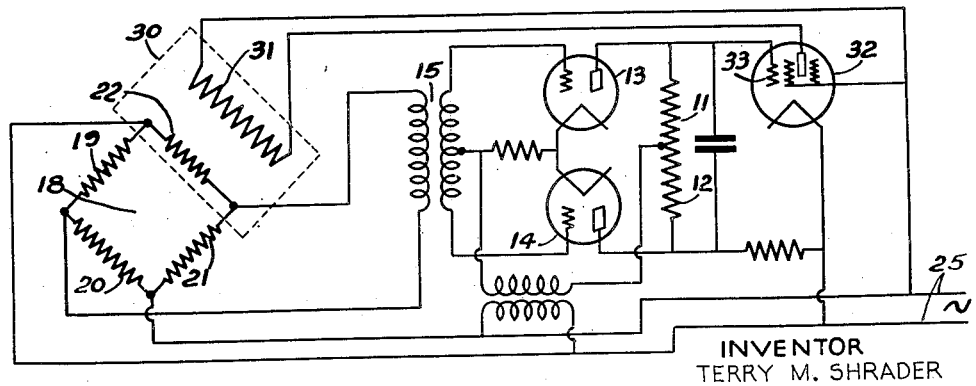

Other features become apparent and a fuller understanding of my invention may be had by referring to the following specification taken in connection with the drawing wherein Figure 1 is a schematic diagram of one form of heat regulator embodying my invention and Figure 2 is a schematic diagram of a modified form of regulating means embodying my invention.

As shown in Figure 1, my invention may be conveniently applied to a high frequency induction heating system comprising a high frequency heating coil 1 positioned over the element or article to be heated, shown by way of example as a vacuum tube, connected to a source of high frequency current 2. The source of high frequency may conveniently comprise an oscillating discharge tube 3, with grid 4 coupled to the output electrode 5 through feed back coupling transformer 6. The temperature of the elements within the field of coil 1 may be controlled by controlling the amplitude or frequency of alternating current generated by current source 2. In the particular form of generator shown, the amplitude of alternating current is regulated by the bias upon grid 4. The grid biasing means has been shown as a grid controlled discharge device 7 with the anode-cathode path 8—9 connected in the grid circuit of the oscillator tube to control the impedance of said grid circuit. The input circuit 9—10 of discharge device 7 is shown connected across output impedances 11 and 12 of rectifiers 13 and 14 whose input electrodes in turn are connected in push-pull through a coupling transformer 15 to points 16 and 17 of bridge circuit 18. While bridge 18 may be balanced with any desired combinations of impedances in its branches, it has been shown by way of example as a resistance bridge including resistors 19, 20, 21 and 22. Bridge 18 is characterized by resistor 22 which has a temperature coefficient of resistance such that at normal operating temperatures its resistance balances bridge 18 so that an alternating current potential impressed upon the diagonal points 23—24 from the alternating current supply 25 does not appear across the opposite diagonal points 16—17 or upon the primary of transformer 15. Resistor 22 may be of carbon, iron, nickel or any metal which has a positive or negative coefficient of resistance.

Resistor 22 may conveniently be mounted upon a metal plate 26 placed in the field of heating coil 1, or if desired, adjacent coil 27 in the output circuit of generator 2, so that the temperature, and accordingly the impedance of resistor 22, is proportional to the amount of the high frequency energy supplied to coil 1. A variation in the amount of high frequency energy dissipated by coil 1 accordingly creates a variation in the impedance of branch 22 and an unbalancing of the bridge 18. The alternating current voltage between points 16 and 17 is accordingly a function of the degree of bridge unbalancing and controls the differential potentials upon the input electrodes of rectifiers 13 and 14. With the output electrodes of rectifiers 13 and 14 energized in phase from mains 25, a direct current potential is created across the ends of resistors 11 and 12, as more fully explained in the application of E. W. Herold, filed April 25, 1934, Serial 722,250, and assigned to the same assignee. The polarity of the potential across the output impedances 11 and 12 depends upon the direction of unbalancing of the bridge, that is, upon the positive or negative value of resistor 22 with respect to its normal value, and the magnitude of the potential, as explained in said application, depends upon the degree of unbalancing of bridge 18.

If, for example, the temperature of resistor 22 rises slightly due to abnormal load conditions on generator 2, the resistance of resistor 22 rises unbalancing the bridge in one direction. This differentially affects the grids of rectifiers 13 and 14 causing an increased flow of anode current through one of the tubes, say through tube 14 depending upon the terminal connections, and thus increases the drop across resistor 12 which in this case swings the bottom end of resistor 12 negative with respect to the upper end of resistor 11, which in turn increases the negative bias upon grid 10 of tube 7. There is then a corresponding increase in the impedance of the grid circuit of the generator 2 resulting in a decrease in amplitude of generated high frequency. It is obvious that a decrease of resistance of resistor 22, unbalances bridge 18 in the opposite direction, causing an increase in anode current in tube 13, a negative shift of the upper end of resistor 11 and a positive bias of grid 10 with an increase in amplitude of generated high frequency.

My invention may, with equal facility, be applied to a constant temperature device or to an electric furnace where a resistance heating element generates directly the necessary heating effect. In Figure 2, heating compartment 30 comprises a resistance heating element 31 connected, through the anode-cathode path of discharge device 32, to current supply mains 25, which may if desired be connected to a conventional 60-cycle commercial power circuit. Here the flow of current to heating element 31 is conveniently controlled by grid 33 in the anode-cathode path of discharge device 32. The bias upon grid 33 may as in the case of the bias upon grid 10, Figure 1, be controlled by the output of the push-pull rectifiers 13 and 14, the input of which is coupled to bridge 18. In this embodiment of my invention, resistor 22 may be positioned within the heating zone of heating element 31, and so adjusted that resistance bridge 18 is unbalanced by a variation from normal of the temperature within the furnace compartment 30. Through the action of the push-pull rectifier the bias upon grid 33 swings in a positive or negative direction depending upon the increase or decrease in resistance of 22, the degree of grid swing depending upon the degree of resistance variation in 22, causing a compensating action in the anode-cathode impedance of valve 32, with a corresponding change in flow of heating current to element 31.

Electrical heating means regulated in accordance with my invention is subject to adjustment upon minute changes in operating conditions. Almost instantaneous adjustments are made with a smoothness and stability in operation not characteristic in heat regulators employing moving parts. The control circuits are energized by alternating current of any commercial frequency thus eliminating batteries or current supply rectifiers, and, in construction, my device requires no bulky mechanical elements and may be fabricated from standard electrical units adapting it for economical and light weight construction.

To those skilled in the art, many modifications of my invention become apparent from the above disclosure. It is accordingly desired that my invention be limited only by the prior art and by the appended claims.

I claim:

1. In an electrical heating system, an electrical heating element, a source of current connected to supply uninterrupted current to said element, current regulating means for said source comprising a grid controlled electron discharge device, means for continuously controlling said current regulating means in response to infinitely small variations in energy dissipation in said heating element to make adjustments in said regulating means proportional to variations in energy dissipation, said means comprising a resistance bridge with one branch including a temperature responsive resistor placed to be heated by said source and with a source of alternating current potential connected across one pair of diagonal points, the other pair of diagonal points being coupled in push-pull to the grids of an alternating current operated push-pull rectifier, an output impedance connected between the anodes of said push-pull rectifier and at an intermediate point to said source of alternating current to energize said anodes in phase, the terminals of the output impedance of said rectifier with its variable voltage and polarity being connected to the input electrodes of said discharge device, the output electrodes of the device being connected to said source of current.

2. In combination, a heating element, a source of energy connected to supply uninterrupted current to said element, and regulating means for exerting a continuous regulating action upon said energy source comprising a temperature responsive resistor connected in one branch of a resistance bridge and positioned within the heating radius of said element, one pair of diagonal points of said bridge being connected to a source of alternating current, two rectifier tubes with their input electrodes coupled in push-pull to the other diagonal points of said resistance bridge and their output electrodes connected through impedance elements to said source of alternating current and energized in phase, and means coupled to spaced points on said impedance elements and responsive to voltages of positive or negative polarity to continuously regulate the flow of energy to said element during positive or negative variations in unbalancing of said bridge due to the resistance changes in said temperature responsive resistor.

3. In a heat regulator comprising a high frequency heating coil connected to a grid controlled oscillator, a resistance bridge, an alternating current operated rectifier, means for controlling the amplitude of oscillations comprising an impedance connected between the anodes of said alternating current operated rectifier, said impedance being connected at its center to a source of alternating current to energize said anodes in phase and coupled at its end to the input electrodes of said oscillator, the input electrodes of said rectifier being coupled in push-pull to diagonal points on a resistance bridge, one branch of said bridge comprising a resistor with a temperature coefficient of resistance positioned in the field of said coil, and the other diagonal points of said bridge being connected to said source of alternating current.

4. A heat regulator comprising a resistance heating element connected to a source of current through the anode-cathode path of a grid controlled electron discharge device, means for regulating the anode-cathode impedance of said device by said grid comprising an alternating current operated push-pull rectifier, an impedance connected between the grid and cathode of said device and between the anodes of said rectifier, a source of alternating current connected to an intermediate point on said impedance, a resistance bridge with one branch comprising a temperature responsive resistor heated by said element, one pair of diagonal points on said bridge being connected to said alternating current source, the other pair of diagonal points on said bridge being coupled in phase opposition to the input electrodes of said rectifier.

TERRY M. SHRADER.